UNITED STATES PATENT OFFICE 2,460,500

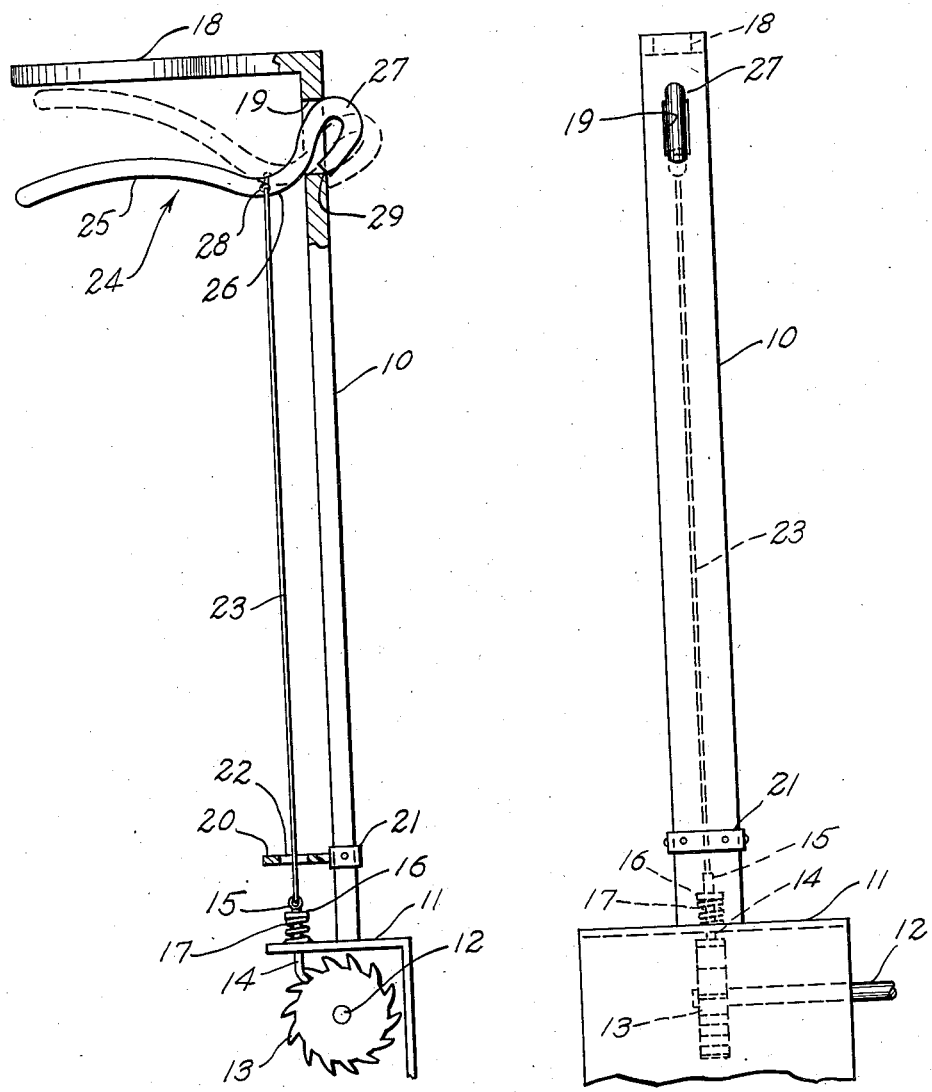

LEVER HANDLE

James R. Hall, Hammon, Okla.

Application April 11, 1947, Serial No. 740,889

3 Claims. (Cl. 74—537)

My invention relates to lever handles and more particularly to handles for spring biased dogs securing a main lever, to which the dog is attached, in an adjusted or fixed position.

The object of my invention is to provide a lever handle consisting of one part only and having no additional working parts, rivets, bolts or the like to get loose or worn.

Other objects of my invention may appear in the following specification describing my invention with reference to the accompanying drawing illustrating a preferred embodiment of my invention.

It is however to be understood that my invention is not to be limited or restricted to the exact construction and combination of parts described in the specification and shown in the drawing, but that such changes and modifications can be made, which fall within the scope of the claims appended hereto.

In the drawing:

Figure 1 is an elevational side view partly shown in section of a lever equipped with a spring biased dog adapted to be operated by means of a lever handle according to my invention, and Figure 2 is an elevational view taken at right angles to Figure 1.

Referring now in detail to the drawing a main lever 10 is rigidly secured to a part 11 of a mechanical device of any kind. This part 11 is rotatably mounted on a stationary shaft 12, on which a ratchet gear 13 is rigidly mounted.

A dog 14 extends slidably through the machine part 11 and is provided at its upper end with an eye 15. Underneath the eye 15 a flange 16 is formed on the dog 14 and a helical tension spring 17 surrounding said dog and arranged between the flange 16 and the part 11 is secured to these two parts and urges the dog 14 downwardly into latching engagement with the ratchet gear 13.

The main lever 10 is provided on its upper end with a handle 18 extending at right angles to the main lever and may extend laterally in any desired direction from the main lever 10 as long as it extends at right angles thereto.

Below the handle 18 the main lever 10 is provided with a longitudinally extending, elongated, rectangular slot 19.

At a distance above the level of the eye 15 of the dog 14 a guide plate 20 is secured to the main lever 10 by means of a frame 21, from which the guide plate extends at right angles.

Directly above the eye 15 of the dog 14 a hole 22 is provided in the guide plate 20 and an actuating wire 23 secured with its lower end to the eye 15 extends upwardly through said hole 22.

A dog handle 24 is made from flat iron and comprises an upwardly curved grip portion 25. At the forward end of the grip portion 25 the lever handle 24 extends upwardly in a curved neck portion 26 and on the end of this neck a substantially oval shaped pivot head 27 is formed. A hole 28 is provided in the curved upwardly extending neck portion 26 adjacent the forward end of the grip portion 25, and the upper end of the operating wire 23 is secured in this hole 28.

The oval pivot head 27 is formed so that it is adapted to enter in and extend through the rectangular slot 19 in the main lever 10.

The end 29 of the flat iron forming the pivot head 27 rests on the lower front edge of the slot 19, the upper portion of the pivot head abuts the upper forward edge of said slot and the upwardly extending curved neck portion 26 engages the lower rear edge of the slot 19, when the dog handle is in working position on the main lever 10 as shown in full lines in Figure 1, The spring 17 urges the dog 14 into latching engagement with the ratchet gear 13 and holds the dog handle 24 in the above described position relative to the main lever 10, so that this main lever is secured in its postion in relation to the shaft 12.

When this relative position of the main lever is to be changed, the grip portion 25 of the dog handle 24 and the handle 18 of the main lever is grasped with one hand and the dog handle 24 is pivoted about the pivot point formed by the end 29 of the pivot head 27 and the lower forward edge of the slot 19 into the position indicated in broken lines in Figure 1.

Thereby the operating wire is pulled upwardly against the force of the spring 17, and the dog 14 is disengaged from the ratchet wheel 13, so that the main lever 10 is free to be pivoted about the shaft 12 into a new desired position. When the dog handle 24 is released, the spring 17 returns it into its normal position and returns the dog 14 into latching engagement with the ratchet wheel 13, securing the main lever 10 in its adjusted position.

Having described my invention I claim as new and desire to secure by Letters Patent:

1. The combination with a stationary shaft, a ratchet wheel fixedly carried by said shaft, a main lever provided with a rectangular slot rotatably mounted on said shaft, and a spring-biased dog in engagement with said ratchet wheel, of a handle operatively connected to said spring-biased dog, said handle comprising a grip portion and a substantially oval pivot head, said head extending through the rectangular slot of the main lever and engaging the opposite edges of said slot under the biasing action of the spring of said dog.

2. The combination with a stationary shaft, a ratchet wheel fixedly carried by said shaft, a main lever provided with a rectangular slot rotatably mounted on said shaft, and a spring-biased dog in engagement with said ratchet wheel, of a handle, and a wire connecting said handle to said spring-biased dog, said handle comprising a grip portion, a curved neck portion, and a substantially oval pivot head, said head extending through the rectangular slot of the main lever and engaging the opposite edges of said slot under the biasing action of the spring of said dog, the curved neck portion being provided with a hole, said wire extending through the hole in said curved portion and secured to the latter.

3. The combination with a stationary shaft, a ratchet wheel fixedly carried by said shaft, a main lever provided with a rectangular slot rotatably mounted on said shaft, and a spring-biased dog in engagement with said ratchet wheel of a handle, and a wire connecting said handle to said spring-biased dog, said handle comprising a grip portion, a curved neck portion, and a substantially oval pivot head, said head extending through the rectangular slot of the main lever and engaging the opposite edges of said slot under the biasing action of the spring, the curved neck portion being provided with a hole, said wire extending through the hole in said curved portion and secured to the latter, and a guide positioned above the dog and secured to the main lever embracing said wire.

JAMES R. HALL.

REFERENCES CITED

The following references are of record in the file of this patent:

UNITED STATES PATENTS

| Number | Name | Date |
|---|---|---|
| 903,139 | Johnson | Nov. 3, 1908 |
| 1,313,253 | Brown et al. | Aug. 19, 1919 |